United States Patent [19]

Drwiega

[11] 4,076,401
[45] Feb. 28, 1978

[54] ARRANGEMENT AND METHOD FOR THE STORAGE OF LANTERN SLIDES AND PROJECTOR FOR VIEWING THEREOF

[76] Inventor: Bohdan Drwiega, "Les Turquoises" Avenue de la Paix, F-06190 Requebrune-Cap-Martin, France

[21] Appl. No.: 734,171

[22] Filed: Oct. 18, 1976

Related U.S. Application Data

[60] Continuation of Ser. No. 565,251, Apr. 4, 1975, abandoned.

[30] Foreign Application Priority Data

Jun. 14, 1974 France .............................. 74 21542
Oct. 16, 1974 Germany ............................ 2449243

[51] Int. Cl.² ...................... G03B 23/10; G03B 21/00
[52] U.S. Cl. .................................... 353/108; 353/120
[58] Field of Search ................. 353/27 A, 27 R, 108, 353/109, 120

[56] References Cited

U.S. PATENT DOCUMENTS

| 2,534,561 | 12/1950 | Silver | 353/27 R |
| 2,563,893 | 8/1951 | Waller | 353/109 |
| 2,586,176 | 2/1952 | Olsen | 353/109 |
| 3,242,605 | 3/1966 | Kleinschmidt | 353/120 |
| 3,762,808 | 5/1971 | Sandmeier | 353/27 R |

Primary Examiner—Steven L. Stephan
Attorney, Agent, or Firm—Haseltine, Lake & Waters

[57] ABSTRACT

An arrangement for the storing of lantern slides in the pockets of a leaf-like mount or support, wherein the pockets form a plurality of rows of pockets and the leaf-like support consists of mutually interhinged components. The present invention provides a leaf-like arrangement for storing slides which renders it possible to change the order or sequence of the slides in accordance with practical requirements while still facilitating the use of slides which are mounted in conventional frames. This invention further relates to a method for projecting slides arranged in accordance with the present invention, and to apparatus for projecting slides using this method.

2 Claims, 14 Drawing Figures

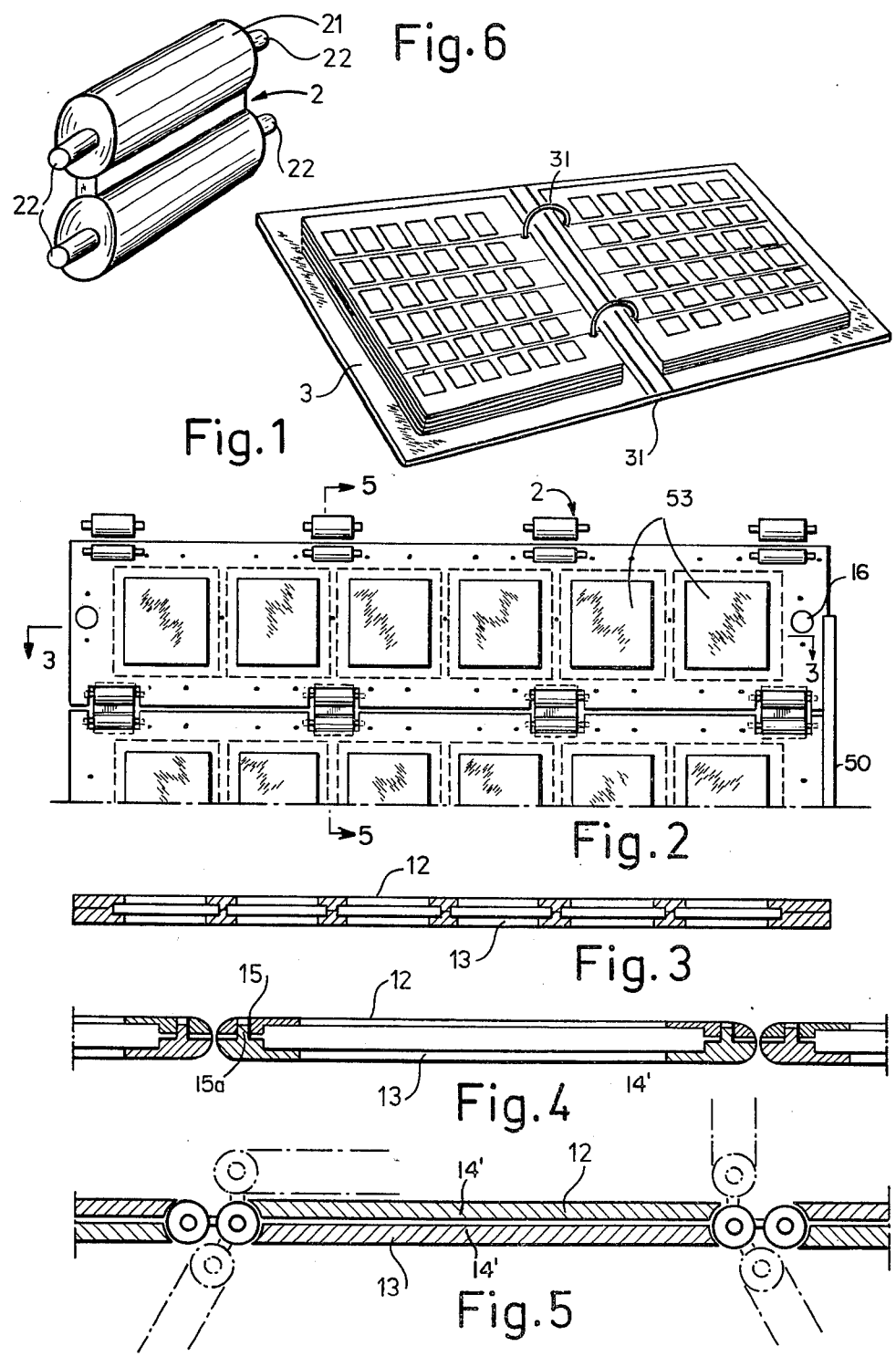

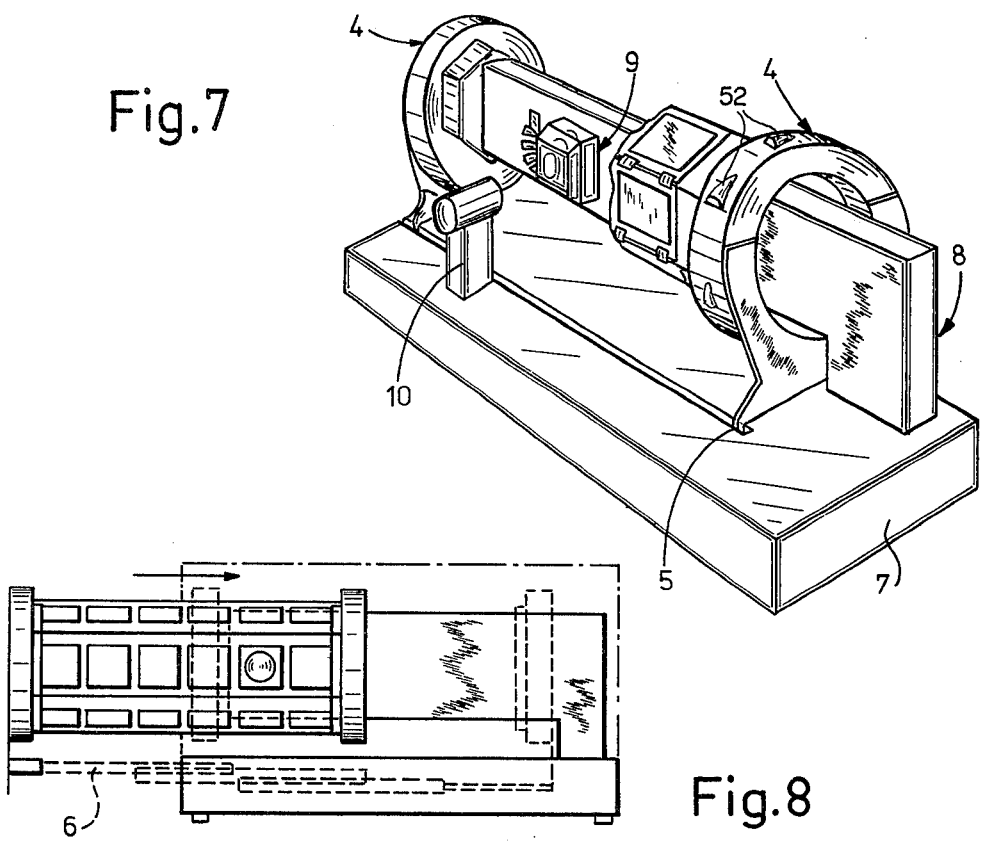
Fig.7
Fig.8
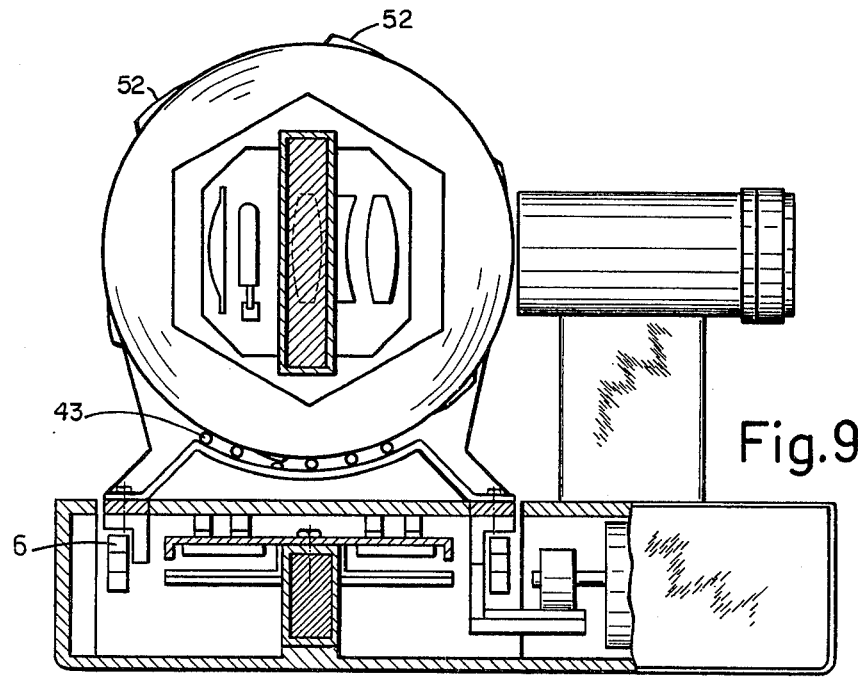
Fig.9

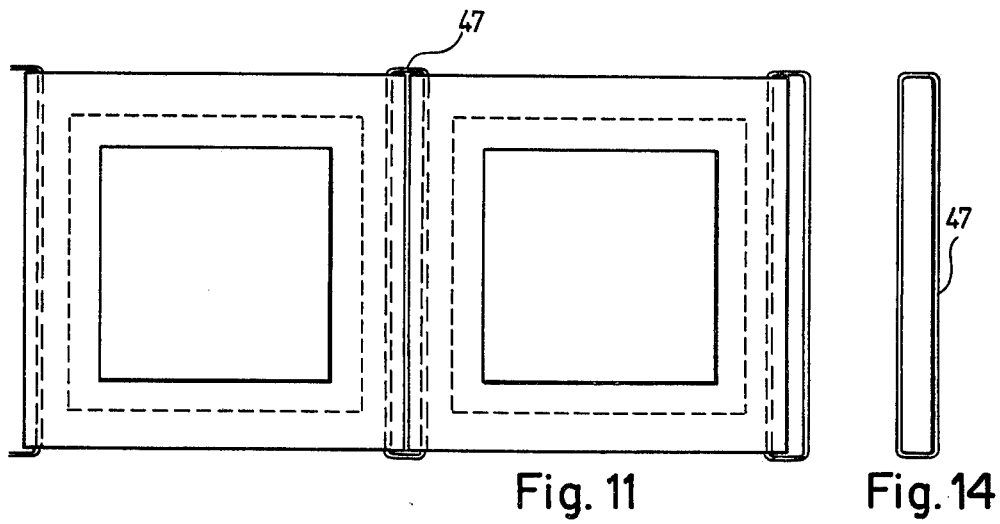
Fig. 11    Fig. 14
Fig. 12
Fig. 13
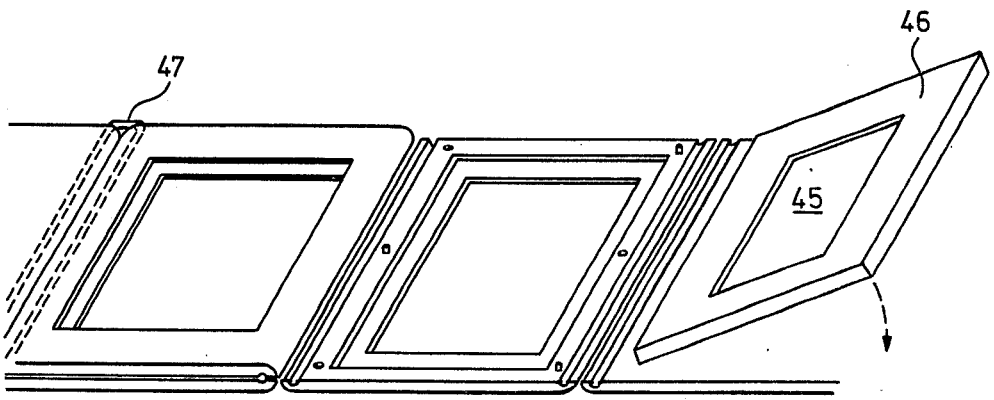
Fig. 10

ARRANGEMENT AND METHOD FOR THE STORAGE OF LANTERN SLIDES AND PROJECTOR FOR VIEWING THEREOF

This is a continuation of application Ser. No. 565,251 filed Apr. 4, 1975 now abandoned.

FIELD OF THE INVENTION

The present invention relates to an arrangement for the storing of lantern slides in the pockets of a leaf-like mount or support, wherein the pockets form a plurality of rows of pockets and the leaf-like support consists of mutually interhinged components.

DISCUSSION OF THE PRIOR ART

Arrangements of the above type are known in various forms. The arrangements enable slides to be stored more efficiently than is the case with currently employed usual methods wherein the individual slides are inserted sequentially one behind the other in wooden boxes. Storing slides in sheet or leaf-like support renders it possible to locate a large number of supports, and thereby the slides, in an album where they are more neatly arranged than in wooden boxes, wherein they are viewable and, for instance, a manual and optical preselection of the slides may be made for a predetermined program.

This invention deals with the problem of assembling a program from slides which are stored in an arrangement having the described construction.

In the previously known leaf-like supports for lantern slides, the user was only able to interchange individual leaves, meaning that the program, in effect, the series sequence of the slides within a sheet, must remain unchanged. As a result, the capacity of a sheet is frequently only partly utilized. When it is intended to change the order of slides within a sheet, the respective slides must be taken from their pockets and then interchanged with each other. Since the slides must be retained in their pockets securely enough to keep them from falling out during normal handling of the sheets or leaves, the extraction and exchange of slides is a time-consuming effort and is particularly disadvantageous when it is necessary to frequently change their order.

In order to eliminate the above-mentioned disadvantage, a method has already been tried through which the slides are individually framed in the usual manner, and whereupon the frames are then assembled so as to form a detachable series or chain. Whereas this is a simple method for simply and conveniently changing the order of the slides, the method has not gained acceptance in practice, because of the need for specially constructed frames.

SUMMARY OF THE INVENTION

In its broad context, the present invention provides a leaf-like arrangement for storing slides which renders it possible to change the order or sequence of the slides in accordance with practical requirements while still facilitating the use of slides which are mounted in conventional frames.

It is a particular object of the present invention to provide an arrangement of the type described in which each of strip-like, hinge-connected supporting members incorporating one or more rows of pockets is detachably connected to other supporting or mounting members.

It has been indicated that by means of this arrangement there will be adequately facilitated a change of programming with very little effort. In fact, there is rarely a need to change the slides, slide for slide, when changing a program. As a rule, the slides are grouped by means of their content so that the order of slides within any particular group can be conveniently permitted to be fixed so as to be unchangeable, but wherein the entire groups of slides can be interchanged when the need therefore arises. The present invention satisfies the above requirements without requiring special preparation of the slides or their frames. Another advantage provided for by this arrangement is that it readily permits individual groups to be combined with only little effort in order to form programs of various lengths. Merely for the purpose of storage the number of slides on a sheet, or the given group on a sheet, may not be exceeded, whereas for the purpose of showing the slides, any number of rows of slides, each alongside the other, may be linked to one another.

Further objects and advantages of the arrangement constructed in accordance with the present invention will become apparent from the following description and from the appended claims.

BRIEF DESCRIPTION OF THE DRAWINGS

This invention further relates to a method for projecting slides arranged in accordance with the present invention, and to apparatus for projecting slides using this method. The objects and advantages of the method and apparatus will become more readily apparent from the description and from the accompany drawings; in which:

FIG. 1 is a perspective representation illustrative of slides retained in leaf or sheet supports constructed in accordance with the present invention, and with the supports being inserted in an album;

FIG. 2 is a top view thereof illustrating a portion of a leaf-like slide support constructed in accordance with the present invention;

FIG. 3 is a sectional view taken along line 3—3 in FIG. 2;

FIG. 4 is a fragmentary enlarged sectional view of FIG. 3;

FIG. 5 is a sectional view taken along line V—V in FIG. 2;

FIG. 6 is a detail view illustrating in perspective representation, on an enlarged scale, a hinge for use between two members of a leaf-like support arranged in accordance with the present invention;

FIG. 7 is a perspective representation illustrating a projector which is constructed in accordance with the present invention;

FIG. 8 is a front view of the apparatus of FIG. 7;

FIG. 9 is a lateral enlarged view, partly in section, of the apparatus of FIGS. 7 and 8; and FIG. 10 is a perspective view of a plurality of hingedly-connected slides.

FIG. 11 is a plan view of a joint construction used in FIG. 10;

FIG. 12 is an end view of FIG. 11 with the joining member used to join neighboring slide frames removed;

FIG. 13 is a sectional view of FIG. 12 and shows a molded construction for the slide frames;

FIG. 14 is a front view of a joining member used in the joint of FIG. 11.

DETAILED DESCRIPTION

Two molded members 12, 13 formed of a relatively resilient plastic material are joined together in order to form a pocket strip. One of the two strips is provided along its circumference with dowels 15a adapted to engage in mating recesses 15 in the second molded member so as to prevent relative motion between them when the two molded members are joined together. Furthermore, when the two molded members are joined together, each of two coaxially arranged pins 22 of a hinge 2 (FIG. 6) are rotatably engaged in mating recesses formed in the two longer sides of the pocket strip. Each hinge 2 consists of two parallel extending cylindrical members 21 which are interconnected by a web and which carry a pin 22 at each end thereof. One coaxial pair of pins is located on one pocket strip and the second coaxial pair of pins is located on a second pocket strip. In this manner, two pocket strips each are joined together for facilitating articulated movement between them, as shown in FIG. 5. Movement between the pocket strips may be prevented, as desired, by means of strip engaging catches 50 which are provided on two opposite lateral edges of several interconnected pocket strips. The individual pockets in the pocket strips are formed on the molded members 12, 13 by means of integrally formed moldings 14' on the members, wherein the height of the moldings corresponds to the distance between two molded members. The moldings form, in spaced relationship, a frame around window-like cut-outs 53 which are formed in the pocket strips. The molded members 12, 13 are flat frames and the moldings are used to space the two frames in order to form the desired pockets. The moldings are spaced apart in a manner whereby one slide each fits generally snugly into a pocket, and the size of window is determined so that the image area of a slide is not obscured by the pocket strip. The slides are inserted at the time that the two pocket strips are joined together.

Each pocket strip is provided with six pockets for, respectively, six slides. Furthermore, six pocket strips are combined so as to form a sheet or leaf-like slide mount or support; with several leaf-like slide mounts being inserted in an album 3. Each album incorporates two snap rings 31, over each of which there is inserted a slide mount or supporting having holes 16 formed therethrough at the ends of each pocket strip. The 36 slides obtained from a film currently used are thus assembled on one leaf or sheet. The disposition of six rows each having 6 slides provides a practical storage arrangement, in a square configuration. It is common practice to combine six exposures each to form a group for a given topic and, whereas exchange of topic groups frequently is necessary, there is no need for interchange within any given topic group. These requirements are satisfied by the slide mount which is arranged in accordance with the present invention.

Under other conditions, however, the slides naturally may also be grouped in other quantities within a row, as well as with respect to the number of rows which are combined in the form of a leaf or sheet.

For purposes of storage, the leaf-like slide mounts are inserted into album 3. Selection is first effected by leafing through the album. More precise or detailed selection, and the viewing of the slides, may follow conventional patterns.

Following is a description of a particularly advantageous projection method and a projector therefore, both being in accordance with the present invention.

Supported on a box-shaped base plate 7 is a cantilever arm 8 and a pedestal 10. The upper surface of box 7 includes a cut-out through which there extends a carriage 5, and which is slidably supported in the box by means of its leg portion resting on telescoping ball guides 6. Mounted on the leg at the ends of the carriage are pedestals, each of which carries a revolving head 4 on the inner side thereof. The pedestal and the revolving head, at the end where the cantilever arm is attached, assume the shape of a ring, with the cantilever arm projecting into the carriage. Between the pedestals, the cantilever arm carries an illuminating box 9, in front of which a console 10 supports a lens. The revolving heads 4 are supported on ball bearing 43 which is retained in brackets on the pedestals.

For viewing purposes, the album leaves or sheets are removed from the album. Their stiffeners are removed and the various rows of pockets are folded one over the other in bellow-like fashion and then placed in a feed magazine of the box 7. Thereafter, the rows of pockets are placed on bearing surfaces on the revolving heads, the number of the surfaces of which corresponds to that of the rows of pockets of an album leaf or sheet. The revolving heads are then rotated in order to place one row of pockets after another between the illuminating box and the lens, whereby rows of pockets of several album leaves or sheets can be connected together. The carriage is moved endwise with the aid of a motor, in order to locate one pocket, or slide, in sequential order between the illuminating box and the lens. Electronic program control can be used to facilitate viewing of all slides of one or more album leaves in succession and row by row or, alternatively, selected slides or rows can be viewed.

For viewing of the slides independently of the mechanically (motor) or manually operated projector, the top side of box 7 incorporates a glass plate which is illuminated from below, and on which the album leaves, or portions thereof, are placed for viewing.

When the rows of pockets have passed the carriage they are folded, again in a bellows-like fashion, and then deposited in a storage magazine.

As it will become readily apparent, the storage device of the present invention is constructed in the configuration of the molded members 12, 13, in accordance with the present invention, whereby slides can be inserted and stored when manufactured in the currently known and utilized manner and which are mounted in their own original frames, whereas the practice, heretofore, has been to remove the slides from their own original frames and mount them in special frames for grouping thereof. The present invention, for the first time, enables the slides to be stored in their normal or usual frames in flat, sheet-by-sheet arrangement, and to be viewed by means of screen projection with no need to remove them from their normal frames, or from the moldings around the frames. The moldings which, in accordance with the present invention, are used to retain the framed slides can suitably be combined to form strings of slides and these, in turn, can be combined to form sheets. For the joining together of the slides, use can be made of the means already described or, equally well, also of wire fasteners. This type of joint is shown in FIG. 10. Each slide 45 is mounted in its normal frame 46, and a thus-framed slide is then inserted between two molded halves 12, 13. When a slide is held between the molded halves, wire fasteners or similar means can be used to form strings of slides which in turn are combined in said manner to form sheets. They are viewed by using suitable projectors, of which a preferred embodiment arranged in accordance with this invention is described herein, or (in auxiliary manner or on smaller measure) by placing them on an illuminated ground glass plate.

While there has been shown what is considered to be the preferred embodiment of the invention, it will be obvious that modifications may be made which come within the scope of the disclosure of the specification.

What is claimed is:

1. A device for the storage of framed slides, each of said slides having a viewing surface, the device comprising: a plurality of pocket strips composed of strip-shaped, superposed bottom and top parts, each of said strips being formed with a plurality of window openings, at least some of said openings being adjacent to one another; a plurality of superposed moldings associated with said strip-shaped parts, respectively, extending along each of said window openings and somewhat recessed with respect thereto, said moldings serving to hold the framed slides with their viewing surfaces in said window openings, one of said strip-shaped parts being formed with a plurality of recesses, one of said moldings including pins fitting into corresponding ones of said recesses of the other of said parts, said pins and said recesses constituting releasable joining means, each of said pocket strips having longitudinal and lateral edges and at least some hinges for linking at least some of said pocket strips to one another at said longitudinal edges to allow articulated movement between the linked pocket strips for projecting purposes; strip engaging catches provided on opposite lateral edges of the linked pocket strips said linked pocket strips forming a plurality of leaves, each of said leaves having an edge formed with perforations, each of said perforations having a predetermined diameter, said perforations being spaced from one another at predetermined distances for the perforation diameters and distances to correspond to those of clamps of an album into which the framed slides are insertable, said strip-shaped parts being inherently stiff so as to permit only a limited amount of elastic deformation.

2. A projection apparatus for projecting a plurality of framed slides including an arrangement for receiving said slides, said arrangement having hinges, and upper and lower strip-shaped parts of a predetermined width and a first length connected by said hinges so as to constitute leaves, comprising: a carriage having opposite ends and two rotatable heads each disposed at one of said ends, respectively, each of said heads having a multi-cornered surface on a side thereof, each of said surfaces having a second length corresponding to the width of said strip-shaped parts, and wherein the distance between said heads corresponds to said first length of said strip-shaped parts so as to carry several of the connected strip-shaped parts, the latter forming a hollow prism between said heads, said prism having a longitudinal axis; a base member slidably mounting said carriage; a source of light and a lens carried by said base member, said source of light and said lens being spaced from one another by a predetermined distance, one of said source of light and said lens being locatable within, and the other of said source of light and said lens being locatable outside of said hollow prism formed by said strip-shaped parts, said prism being held on at least one of said multi-cornered surfaces of the heads; an arm for holding said one of said source of light and said lens inside of said prism, said arm protruding from said prism on one open side thereof, one of said heads being formed with a recess for receiving said arm, said arm being disposed on said base member laterally of said carriage, said heads being rotatable about the longitudinal axis of said prism, the longitudinal movement of said carriage corresponding to the length of said prism; and means for manually controlling the travel of said carriage and the rotation of said heads.

* * * * *